US007881655B2

(12) United States Patent
Asami

(10) Patent No.: US 7,881,655 B2
(45) Date of Patent: Feb. 1, 2011

(54) MOVER, INFORMATION CENTER, AND MOBILE COMMUNICATION SYSTEM

(75) Inventor: Ken Asami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 892 days.

(21) Appl. No.: 11/631,706

(22) PCT Filed: Jul. 12, 2005

(86) PCT No.: PCT/JP2005/012808

§ 371 (c)(1), (2), (4) Date: Jan. 5, 2007

(87) PCT Pub. No.: WO2006/009007

PCT Pub. Date: Jan. 26, 2006

(65) Prior Publication Data

US 2007/0249284 A1 Oct. 25, 2007

(30) Foreign Application Priority Data

Jul. 15, 2004 (JP) ............................ 2004-209072

(51) Int. Cl.

| | |
|---|---|
| ***H04H 20/71*** | (2008.01) |
| ***H04W 24/00*** | (2009.01) |
| ***H04M 1/00*** | (2006.01) |
| ***G01C 21/30*** | (2006.01) |
| ***G01C 21/32*** | (2006.01) |
| ***G01C 21/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl. ................ 455/3.01; 455/456.1; 455/550.1; 455/456.6; 455/456.5; 701/201; 701/13; 701/213

(58) Field of Classification Search ................ 701/201, 701/13, 213; 455/3.01, 456.1, 550.1, 456.6, 455/456.5

See application file for complete search history.

(56) References Cited

U.S. PATENT DOCUMENTS 6,750,816 B1 * 6/2004 Kunysz ................ 342/357.59

(Continued)

FOREIGN PATENT DOCUMENTS

JP 05-167565 7/1993

(Continued)

*Primary Examiner*—Matthew D Anderson
*Assistant Examiner*—Bobbak Safaipour
(74) *Attorney, Agent, or Firm*—Carrier Blackman & Associates, P.C.; William D. Blackman; Joseph P. Carrier

(57) ABSTRACT

A mover such as a vehicle acquires the information, which has been updated by broadcasting/communication during an engine stall or in an unreceivable state, after the engine start or the recovery of reception. The engine stall period and the unreceivable state continuation period of the mover are monitored and are notified after the engine start from a communication device to an information center and a mounted device. In response to this notification, the information center extracts the information, which has been updated during the engine stall period and the unreceivable state continuation period, and transmits the information to the communication device of the mover. As a result, the mover can always hold the latest information of a broadcast receiving device, the communication device and an information service device.

10 Claims, 5 Drawing Sheets

U.S. PATENT DOCUMENTS

| | | | | |
|---|---|---|---|---|
| 6,978,152 | B1 | 12/2005 | Yamaashi et al. | |
| 7,246,009 | B2 * | 7/2007 | Hamblen et al. | 701/209 |
| 7,256,711 | B2 * | 8/2007 | Sheha et al. | 340/995.1 |
| 7,263,375 | B2 * | 8/2007 | Zavada et al. | 455/456.6 |
| 7,783,417 | B2 * | 8/2010 | Vavrus | 701/200 |
| 2003/0081671 | A1 | 5/2003 | Ishida et al. | |
| 2003/0108068 | A1 | 6/2003 | Futamata | |
| 2003/0182052 | A1 * | 9/2003 | DeLorme et al. | 701/201 |
| 2006/0148488 | A1 * | 7/2006 | Syrbe | 455/456.1 |
| 2007/0159388 | A1 * | 7/2007 | Allison et al. | 342/357.09 |
| 2008/0036778 | A1 * | 2/2008 | Sheha et al. | 345/502 |
| 2008/0177430 | A1 * | 7/2008 | Tekawy et al. | 701/13 |
| 2009/0287407 | A1 * | 11/2009 | Sheha et al. | 701/201 |

FOREIGN PATENT DOCUMENTS

| | | |
|---|---|---|
| JP | 06-224863 | 8/1994 |
| JP | 10-209954 | 8/1998 |
| JP | 11-068686 | 3/1999 |
| JP | 11-102287 | 4/1999 |
| JP | 11-154973 | 6/1999 |
| JP | 2001-53699 | 2/2001 |
| JP | 2002-237813 | 8/2002 |
| JP | 2002-290357 | 10/2002 |
| JP | 2002-325068 | 11/2002 |
| JP | 2003-134064 | 5/2003 |
| JP | 2004-088517 | 3/2004 |
| JP | 2004-125506 | 4/2004 |

* cited by examiner

MOVER, INFORMATION CENTER, AND MOBILE COMMUNICATION SYSTEM

TECHNICAL FIELD

The present invention relates to a mobile body, for example, a mobile body which is capable of acquiring information via at least one of broadcasting and communication services from an information center through an antenna mounted on a vehicle such as an automobile or the like. The present invention also relates to an information center and a mobile communication system.

BACKGROUND ART

Heretofore, there have been proposed various mobile broadcasting systems or mobile communication systems for providing mobile bodies with information through wireless links (Patent Document 1, Patent Document 2).

For example, Patent Document 1 discloses a vehicle broadcast reception system for re-receiving a broadcast if a running vehicle has failed to receive the broadcast while the vehicle was passing through a poor reception site, such as in a tunnel or below an overhead line, even when the vehicle was positioned in the broadcasting area of a broadcasting station.

According to the technology disclosed in Patent Document 1, the positional information of the vehicle, which is acquired by a GPS receiver or the like mounted on the vehicle, is continuously transmitted from the vehicle to an information center. The information center, which stores continuous broadcast data in its memory, searches its own map database based on the received positional information of the vehicle, and identifies a poor reception site and a poor reception time. Then, the information center reads information broadcast at the poor reception time, for examples, compresses the read information, and transmits the compressed information to the vehicle. The vehicle receives the transmitted information, so as to allow the vehicle occupants to view a broadcast that could not be received at a poor reception site, such as in a tunnel.

However, the disclosed technology is disadvantageous in that the information center is required to have a poor reception site database, as well as a predictor and a decision unit for identifying poor reception sites and poor reception times. Further, it is highly costly to construct the information center through the generation of the poor reception site database, the development of programs for the predictor and the decision unit, etc.

In order to solve the above problems, an information communication system disclosed in Patent Document 2 is capable of subsequently setting a data supply time when a vehicle is unable to receive data, such as when the vehicle is not in use or when a vehicle-mounted communication device is switched off, and requesting an information center to retransmit the data to acquire the non-acquired data.

The technology disclosed in Patent Document 2 is problematic since in order to set the data supply time, the data of a next scheduled updating time must be included within the data transmitted from the information center, and the frame structure of the transmitted data is limited to a certain structure.

Patent Document 1: Japanese Laid-Open Patent Publication No. 11-68686 (FIG. 2).

Patent Document 2: Japanese Laid-Open Patent Publication No. 11-154973 (FIG. 3).

DISCLOSURE OF THE INVENTION

Recently, digital terrestrial broadcasting services have started transmitting test broadcasts. According to such digital terrestrial broadcasting services, software to be installed in reception terminals mounted on mobile bodies such as vehicles, and the software required to view programs, are actually transmitted through digital broadcasting waves. In such an environment, in view of the conventional drawbacks, it is important for vehicle-mounted reception terminals, which are not always supplied with electric power, to have software updating technology that does not make it highly costly to construct an information center, and which does not require the use of a data frame structure for setting data supply times.

The present invention has been made in view of the above shortcomings. It is an object of the present invention to provide a mobile body, an information center, and a mobile communication system, which are capable of re-receiving information with a simple arrangement, even if the information from broadcasting and/or communication services could not be received.

Another object of the present invention is to provide a mobile body, an information center, and a mobile communication system, which do not make it highly costly to construct the information center, which do not need to use a data frame structure for setting data supply times, and which are capable of re-receiving information with a simple arrangement, even if the information from broadcasting and/or communication services could not be received.

Still another object of the present invention is to provide a mobile communication system, which is capable of storing latest information at all times by downloading information that has been updated by broadcasting and/or communication services through a communication terminal mounted on a mobile body such as a vehicle or the like, while the engine of the vehicle is not operating or the vehicle is unable to receive information.

A mobile communication system according to the present invention has an information center and a mobile body for acquiring information via at least one of broadcasting and communication services from the information center, wherein the mobile body comprises a broadcast receiving means for receiving information broadcast by the information center, a mobile communication means connected in communication with the information center, for transmitting information to and receiving information from the information center, an information storing means for storing received information, and a determined result information generating means for determining an unreceivable state of the broadcast receiving means, and generating a determined result as information, and wherein the information center comprises a broadcast transmitting means for broadcasting information to the mobile body, an information center communication means connected in communication with the mobile body, for transmitting information to and receiving information from the mobile body, and a retransmission information generating means for determining information broadcast when the mobile body is in an unreceivable state, based on the determined result which is received thereby, and generating retransmission information to be retransmitted to the mobile body.

A mobile body according to the present invention comprises a broadcast receiving means for receiving information broadcast by an information center, a mobile communication means connected in communication with the information center, for transmitting information to and receiving information from the information center, an information storing means for storing received information, and a determined result information generating means for determining an unreceivable state of the broadcast receiving means, and generating a determined result as information, wherein, when the mobile communication means transmits information of the determined result to the information center, the information center determines information broadcast when the mobile body is in an unreceivable state, based on the determined result, so as to generate and transmit retransmission information, and wherein the mobile communication means receives the retransmission information.

An information center according to the present invention comprises a broadcast transmitting means for broadcasting information to a mobile body, an information center communication means connected in communication with the mobile body, for transmitting information to and receiving information from the mobile body, and a retransmission information generating means for determining information broadcast when the mobile body is in an unreceivable state, based on information of the determined result of the unreceivable state of the mobile body, which is transmitted from the mobile body and received by the information center communication means, and generating retransmission information to be retransmitted to the mobile body.

A mobile communication system according to the present invention has an information center and a mobile body for acquiring information via communication services from the information center, wherein the mobile body comprises a mobile communication means connected in communication with the information center, for transmitting information to and receiving information from the information center, an information storing means for storing received information, and a determined result information generating means for determining an uncommunicatable state of the mobile communication means, and generating a determined result as information, and wherein the information center comprises an information center communication means connected in communication with the mobile body, for transmitting information to and receiving information from the mobile body, and a retransmission information generating means for determining information transmitted when the mobile body is in an uncommunicatable state, based on the determined result which is received thereby, and generating retransmission information to be retransmitted to the mobile body.

A mobile body according to the present invention comprises a mobile communication means connected in communication with an information center, for transmitting information to and receiving information from the information center, an information storing means for storing received information, and a determined result information generating means for determining an uncommunicatable state of the mobile communication means, and generating a determined result as information, wherein, when the mobile communication means transmits information of the determined result to the information center, the information center determines information transmitted when the mobile body is in an uncommunicatable state, based on the determined result, so as to generate and transmit retransmission information, and wherein the mobile communication means receives the retransmission information.

An information center according to the present invention comprises an information center communication means connected in communication with a mobile body, for transmitting information to and receiving information from the mobile body, and a retransmission information generating means for determining information transmitted when the mobile body is in an uncommunicatable state, based on information of a determined result of the uncommunicatable state of the mobile body, which is transmitted from the mobile body and received by the information center communication means, and generating retransmission information to be retransmitted to the mobile body.

The determined result information generating means for determining an unreceivable state of the broadcast receiving means and generating a determined result as information may further comprise an engine shutoff period determined result information generating means for generating as information a determined result in which an engine shutoff period is determined as an unreceivable state (period), if the mobile body comprises a mobile body to which a propulsive force is applied by an engine.

The determined result information generating means for determining an uncommunicatable state of the mobile communication means and generating a determined result as information may further comprise an engine shutoff period determined result information generating means for generating as information a determined result in which an engine shutoff period is determined as an uncommunicatable state (period), if the mobile body comprises a mobile body to which a propulsive force is applied by an engine.

The determined result information generating means for determining an unreceivable state of the broadcast receiving means and generating a determined result as information may further comprise an outside-of-broadcasting-area determined result information generating means for generating as information a determined result in which a period in which the mobile body is positioned outside of a broadcasting area is determined as an unreceivable state (period).

The determined result information generating means for determining an uncommunicatable state of the mobile communication means and generating a determined result as information further comprises an outside-of-communication-area determined result information generating means for generating as information a determined result in which a period in which the mobile body is positioned outside of a communication area is determined as an uncommunicatable state (period).

The retransmission information may be information identical to unreceived information that cannot be received, or information that is a summary of the unreceived information, e.g., so-called digest information. Specifically, the user should preferably be able to select either the retransmission of the unreceived information regardless of the intention of the user, or the transmission of the digest information, which gives an opportunity for the user to determine whether information identical to the unreceived information is to be received or not based on the digest information.

If the digest information is received as retransmission information, the user selects, with a selective information input means, guidance information for an area where information identical to the unreceived information can be received, or an area where an information recording medium such as a recording medium with the unreceived information recorded therein can be acquired.

The information center is associated with the broadcast transmitting means and the information center communication means. The present invention also covers a mobile communication system, wherein the broadcasting transmission means is positionally separated from the information center.

According to the present invention, since the determined result information generating means is provided for determining an unreceivable state of the broadcast receiving means and generating a determined result as information, and the determined result is transmitted to the information center, information can be rereceived by means of a simple arrangement.

According to the present invention, furthermore, since the determined result information generating means is provided for determining an uncommunicatable state of the mobile communication means and generating a determined result as information, and the determined result is transmitted to the information center, information can be rereceived by means of a simple arrangement.

According to the present invention, therefore, even if the broadcast information and/or communication information cannot be received, there are provided a mobile body, an information center, and a mobile communication system, each with a simple arrangement, which enable the information center to be constructed at a low cost, and which do not need to use a data frame structure for setting data supply times.

According to the present invention, moreover, software or the like contained within mounted devices on the mobile body can be updated so as to contain the latest available information at all times.

BEST MODE FOR CARRYING OUT THE INVENTION

Embodiments of the present invention shall be described below with reference to the drawings.

Figure 1:
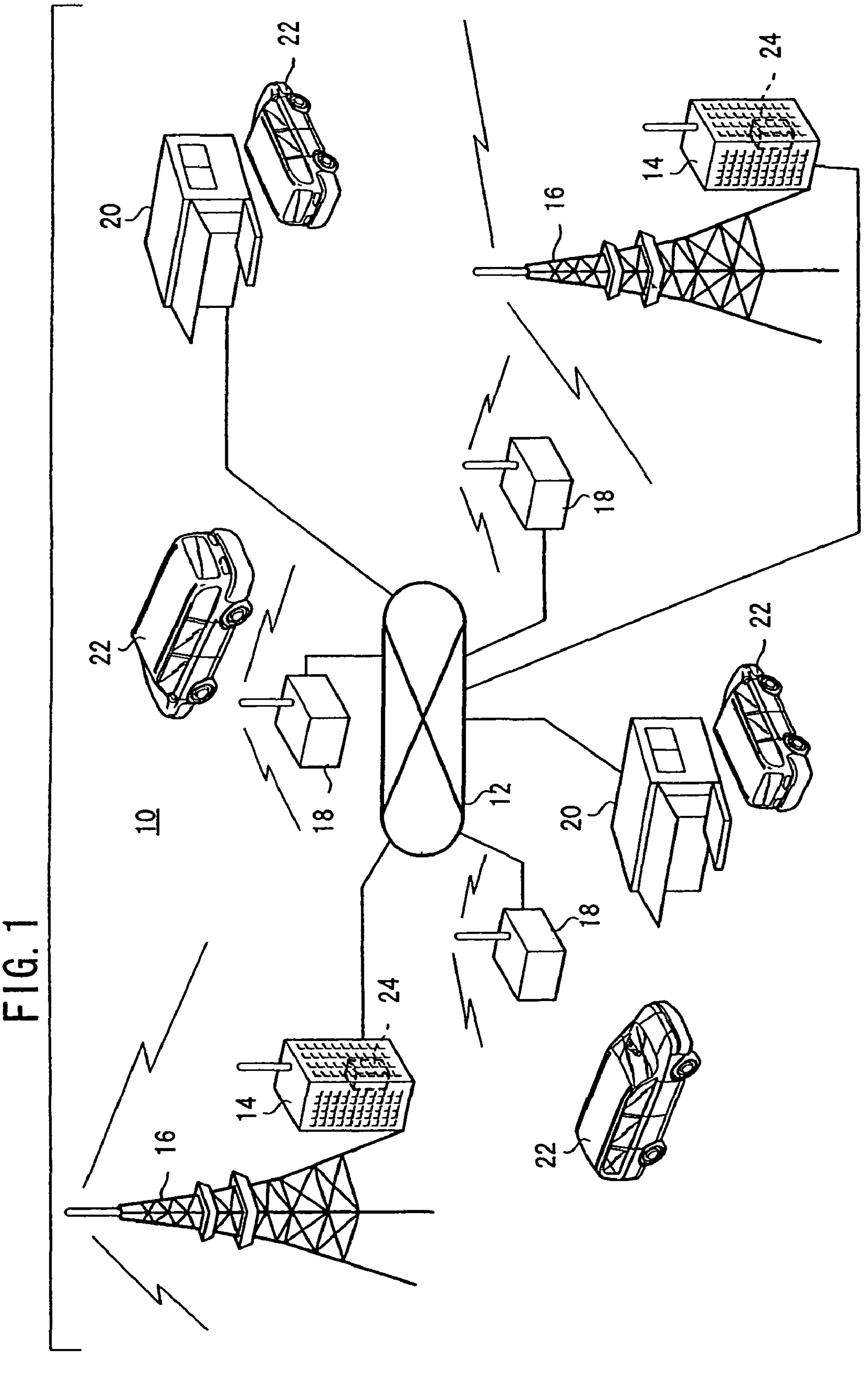
FIG. 1 is a view showing an overall general arrangement of a mobile communication system according to an embodiment of the present invention.

FIG. 1 is a view showing an overall general arrangement of a mobile communication system 10 according to an embodiment of the present invention.

Figure 2:
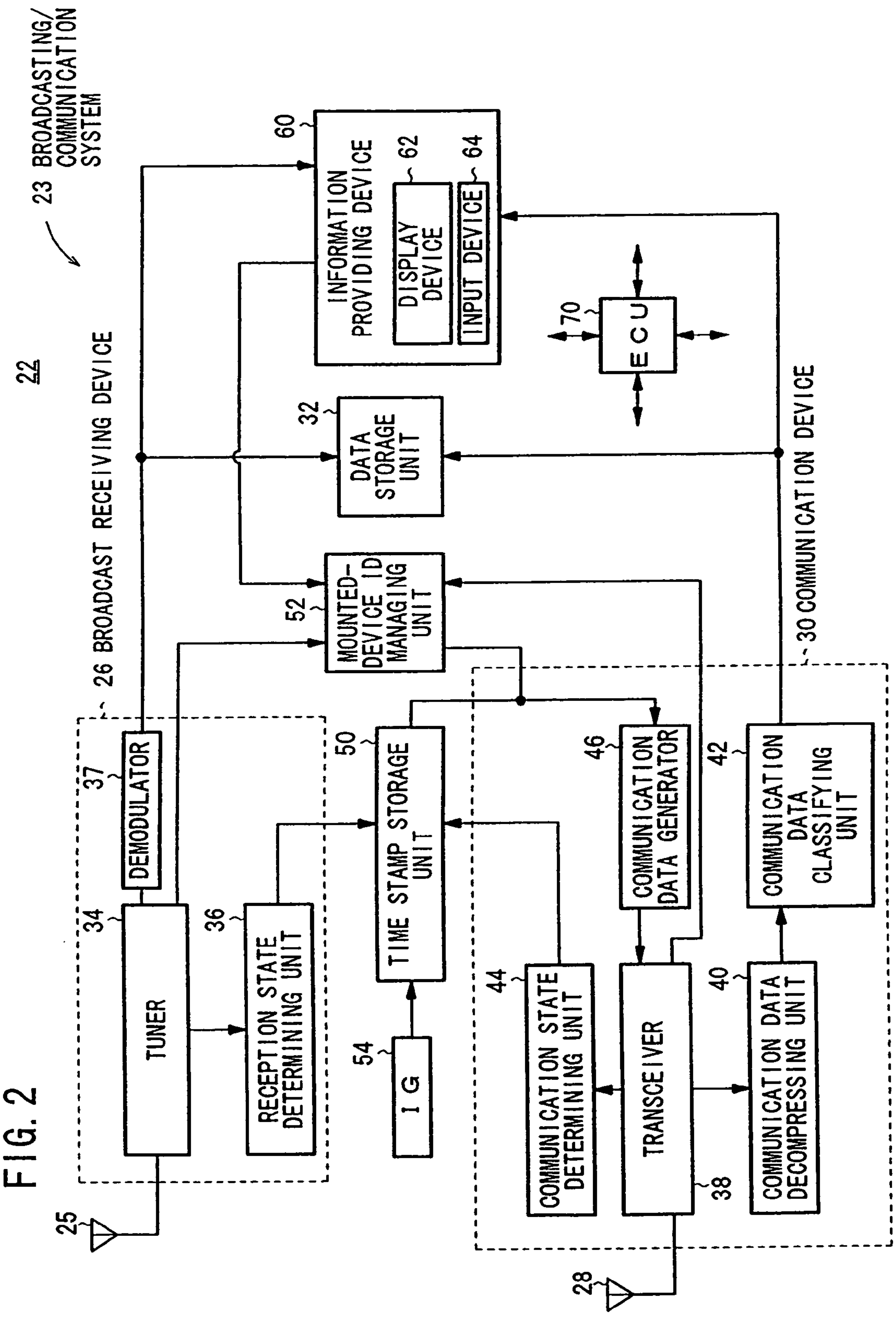
FIG. 2 is a block diagram of a broadcasting/communication system involved in broadcasting and communication services, which is mounted on a mobile body according to an embodiment of the present invention, and wherein the broadcasting/communication system is part of the mobile communication system shown in FIG. 1.

FIG. 2 is a block diagram of a broadcasting/communication system 23 involved in broadcasting and communication services, which is mounted on a mobile body 22 according to an embodiment of the present invention, and wherein the broadcasting/communication system 23 is part of the mobile communication system 10 shown in FIG. 1.

Figure 3:
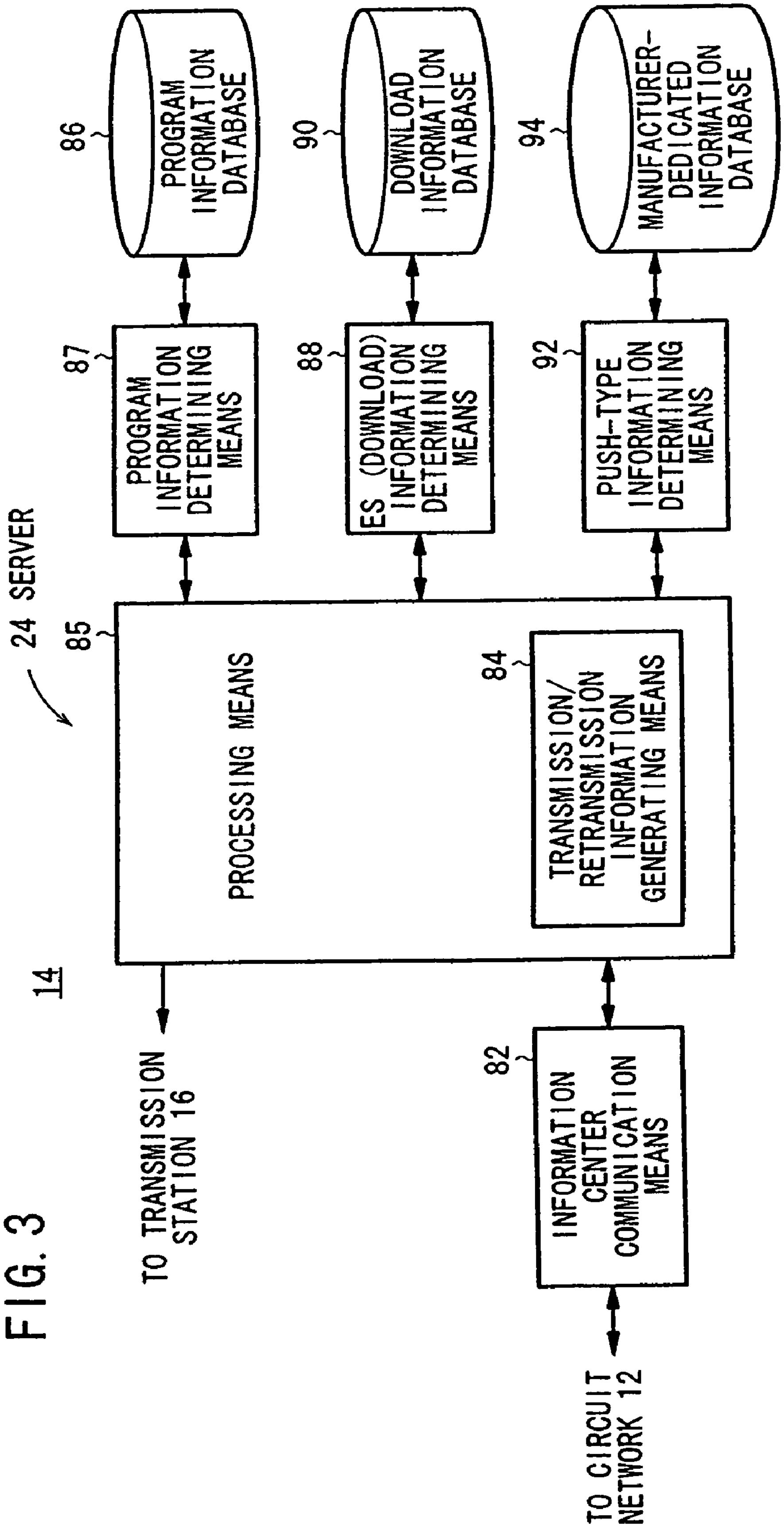
FIG. 3 is a functional block diagram of a server of an information center according to an embodiment of the present invention, wherein the information center is part of the mobile communication system shown in FIG. 1.

FIG. 3 is a functional block diagram of a server 24 of an information center 14 according to an embodiment of the present invention, wherein the information center 14 forms part of the mobile communication system 10 shown in FIG. 1.

As shown in FIG. 1, the mobile communication system 10 basically comprises information centers 14 connected through wired or wireless links to a circuit network 12 such as a public circuit network including a cellular phone network, base stations 18 serving as wireless communication bases which cover certain communication areas as wireless communication ranges, mobile bodies 22 such as vehicles or the like propelled by engines, and dealers (sales shops) 20 for the mobile bodies 22.

Each of the information centers 14 includes a transmitting station 16 as a broadcast transmitting means for broadcasting information such as digital terrestrial broadcasts within a certain broadcasting area, and further has a server 24 having a transmission/retransmission information generating means 84.

As shown in FIG. 3, the server 24 of each of the information centers 14 has a processing means 85 implemented by a computer including the transmission/retransmission information generating means (a means functioning both as a transmission information generating means and a retransmission information generating means), which supplies broadcasting transmission information or retransmission information to the transmitting station 16 and transmits data to the mobile bodies 22 through the circuit network 12 and the base stations 18.

The server 24 also has a program information determining means 87, a program information database 86 for storing program information and program contents, an ES (engineering service) information determining means 88, a download information database 90, a push-type information determining means 92 for determining push-type information such as manufacturer information, advertisement information, etc., and a manufacturer-dedicated information database 94 for storing push-type information such as manufacturer information, advertisement information, etc.

When the program information determining means 87 receives unreceived program information from a mobile body 22 through the circuit network 12 and an information center communication means 82, the program information determining means 87 determines and reads an unreceived program represented by the unreceived program information from the program information database 86, converts the program into compressed data, and supplies the compressed data to the transmission/retransmission information generating means 84. The compressed data, or digest information thereof that is supplied to the transmission/retransmission information generating means 84, is retransmitted from the transmitting station 16 or through the information center communication means 82 to the mobile body 22.

The push-type information determining means 92 serves as a determining means for positively providing information from the manufacturer-dedicated information database 94 to a corresponding mobile body 22 through the transmission/retransmission information generating means 84 and the information center communication means 82.

When the ES information determining means 88 receives unreceived information, such as updating information (updating data) or the like with respect to a device mounted on the mobile body 22, from the mobile body 22 through the circuit network 12 and the information center communication means 82, the ES information determining means 88 searches the download information database 90 for updating data for the unreceived information, extracts the updating data, compresses the extracted updating data into compressed data, and supplies the compressed data to the transmission/retransmission information generating means 84. The compressed data, or digest information thereof that is supplied to the transmission/retransmission information generating means 84, is retransmitted from the transmitting station 16 or through the information center communication means 82 to the mobile body 22.

The information center communication means 82 is connected in communication with a mobile body 22 positioned within a communication area covered by a base station (wireless base station) 18 through the circuit network 12 and the base station 18, and transmits and receives information between the mobile body 22 and the server 24 of the information center 14.

In the present embodiment, since each of the information centers 14 is associated with the transmitting station 16, it doubles as a broadcast transmitting means. The present invention also covers a mobile communication system wherein the information center 14 and the transmission station, such as a broadcasting station or the like, are positioned separately from each other.

As shown in FIG. 2, each of the mobile bodies 22 comprises a broadcast receiving device 26 as a broadcast receiving means for receiving, through a broadcasting antenna 25, information that is broadcast within a given broadcasting area by the information center 14 through the transmitting station 16, a communication device 30 as a mobile body communicating means connected in communication with the information center 14 through the circuit network 12 and the base station 18 via a communication antenna 28, for transmitting information to and receiving information from the information center 14, and a data storage unit 32 as an information storage means for storing information received through broadcasts, as well as information received through communications, each as digital data (digital contents or software).

The broadcast receiving device 26 comprises a tuner 34 for selecting a desired broadcasting channel, a demodulator 37 for demodulating and outputting information in the selected broadcast channel, and a reception state determining unit 36 as a determined result information generating means for determining a broadcast reception state, i.e., for determining an unreceivable state of the broadcast receiving device 26 based on a received electric field output of the tuner 34, and generating and outputting the determined result as information.

The communication device 30 comprises a transceiver 38 for transmitting information through the communication antenna 28 to the base station 18, and which covers a communication area where the mobile body 22 is positioned, a communication data decompressing unit 40 for decompressing and outputting communication data received through the communication antenna 28 and the transceiver 38, a communication data classifying unit 42 for classifying and outputting decompressed communication data according to genre or the like, a communication state determining unit 44 as a determined result information generating means for determining a communication state, i.e., for determining an uncommunicatable state of the communication device 30 based on an output from the transceiver 38, and outputting a determined result as information, and a communication data generator 46.

The mobile body 22 also has a time stamp storage unit 50 serving as a time information managing and assigning means, and a mounted-device ID managing unit (also referred to as a device ID managing unit) 52. The time stamp storage unit 50 determines an engine operating state, as to whether the engine of the mobile body 22 is in operation or shut off, based on on/off information from an ignition switch 54 as an engine shut-off period determined result information generating means, and outputs information of the determined result of the engine operating state, information of the determined result of the broadcasting reception state from the reception state determining unit 36, and information of the determined result of the communication state from the transceiver 38, together with a time stamp in year, month, day, hour, minute, and second being applied to each information, to the communication data generator 46.

The mounted-device ID managing unit 52 outputs identification codes (simply referred to as mounted-device IDs) of the tuner 34, the transceiver 38, and an information providing device 60, each of which is replaceable with a higher-level device and whose software and data can be updated, to the communication data generator 46.

The tuner 34, the transceiver 38, and the information providing device 60 can have its functions updated, e.g., changed or improved by software (downloaded software) received through a broadcast, or by software (downloaded software) received through communications.

In the present embodiment, the information providing device 60 also functions as a navigation device, and further, may also function as an audio/video device and a computer. The functions of such devices can also be changed or updated by the communication device 30.

The communication data generator 46 generates communication data representing information of various determined results, along with an added time stamp and a mounted-vehicle ID assigned thereto, and outputs the generated communication data to the transceiver 38. The transceiver 38 transmits the communication data through the communication antenna 28, the base station 18, and the circuit network 12, to the information center communication means 82 of the server 24 of the information center 14.

At this time, the transmission/retransmission information generating means 84 of the server 24 functions as a retransmission information generating means (also referred to as an updating information generating means).

The transmission/retransmission information generating means 84 first determines information that is broadcast from the transmitting station 16 when an unreceivable state of the broadcast receiving device 26 of the mobile body 22 continues, based on the program information database 86, and based on information of various determined results with mounted-device IDs and time stamps assigned thereto, which has been received through the information center communication means 82, so as to generate retransmission information to be retransmitted to the mobile body 22. Secondly, the transmission/retransmission information generating means 84 determines updating information that is transmitted from the base station 18 when an unreceivable state of the communication device 30 of the mobile body 22 continues, so as to generate retransmission information to be retransmitted to the mobile body 22.

When the broadcast receiving device 26 of the mobile body 22 is in an unreceivable state and the communication device 30 is in an uncommunicatable state, the mobile body 22 is in a period wherein the broadcast receiving device 26 and the communication device 30 are incapable of receiving broadcasts and also of communicating (transmitting and receiving data). Moreover, in such states, the mobile body 22 is also in a period wherein the engine of the mobile body 22 is shut off, and thus the broadcast receiving device 26 and the communication device 30 are incapable of receiving broadcasts and also of communicating (transmitting and receiving data), with their power supplies being continuously turned off.

The retransmission information with respect to broadcasts generated by the transmission/retransmission information generating means 84 is broadcast within a certain broadcast area from the transmitting station 16, or is transmitted to the corresponding mobile body 22 from the information center communication means 82 through the circuit network 12 and from the base station 18 which covers a communication area within which the corresponding mobile body 22 is positioned.

The retransmission information with respect to communications generated by the transmission/retransmission information generating means 84 is transmitted to the corresponding mobile body 22 from the information center communication means 82 through the circuit network 12 and from the base station 18, which covers a communication area within which the corresponding mobile body 22 is positioned.

As shown in FIG. 2, the broadcasting/communication system 23 of the mobile body 22 also includes an information providing device 60, which doubles as a navigation system. The information providing device 60 reads digital data (digital contents) directly from the broadcast receiving device 26 and the communication device 30, or reads digital data (digital contents) stored in the data storage unit 32, and reproduces the digital data as video images and audio sounds on a display unit 62, which functions as a display, and speakers to provide the reproduced image and sounds to the user. The information providing device 60 has an input device 64 serving as a selective information input means for allowing the user to make desired selections and inputs based on the reproduced video images and audio sounds.

The broadcast receiving device 26, the communication device 30, the time stamp storage unit 50, the mounted-device ID managing unit 52, the data storage unit 32, the ignition switch 54, and the information providing device 60 of the broadcasting/communication system 23 are controlled as a whole by a broadcasting/communication ECU 70, which comprises a computer connected thereto.

The mobile body 22, the information center 14, and the mobile communication system 10 according to the present embodiment are basically constructed and operate as described above.

Operations of the present embodiment shall be described in detail below with reference to the flowchart shown in FIG. 4, with respect to, for example, a downloading process (retransmission) for downloading information (updated information) updated while an engine shut-off state has continued, when the engine of the mobile body 22 is started (turned on) after it has been shut off (turned off). A program represented by the flowchart is executed primarily by the ECU 70.

In step S1, the ECU 70 detects when the engine is turned on by the user operating the ignition switch 54 for use as the second or ending time stamp of the unreceivable period. After detection, in step S2, the ECU 70 reads a storage location that stores the time stamp corresponding to the time that the engine has been turned off from the time stamp storage unit 50 for use as the first or initial time stamp of the unreceivable period. In step S3, the ECU 70 reads the mounted-device IDs of the tuner 34, the transceiver 38, and the information providing device 60 from the mounted-device ID managing unit 52, and sends the read mounted-device IDs to the communication data generator 46.

In step S4, the ECU 70 controls the communication data generator 46 to assign the device IDs to information of various determined results, with time stamps added thereto, thereby generating communication data.

The generated communication data is transmitted as radio waves by the transceiver 38 through the communication antenna 28. The transmitted radio wave is received by the base station 18, which covers the communication area. The communication data received by the base station 18 is transmitted through the circuit network 12 to the information center communication means 82 of the server 24 of the information center 14.

The circuit network 12 stores the communication area, i.e., a so-called zone, of the base station 18, wherein the mobile body 22 is positioned according to the same process as a cellular phone system. Therefore, the communication data may be transferred to the server 24 of the information center 14 that is associated with the transmitting station 16 and which covers the zone of the mobile body 22, which is going to transmit broadcast data in return for the communication data received by the base station 18, or may be transferred to all of the information centers 14. The returning communication data is transmitted from the transmission/retransmission information generating means 84 of the server 24 of the information center 14 to the mobile body 22 through the information center communication means 82, the circuit network 12, and the base station 18 within the zone.

In step S6, data of retransmission information for return, which is to be retransmitted (broadcast data for return or communication data for return), is generated by the transmission/retransmission information generating means 84 of the processing means 85 of the server 24 of the information center 14, based on the communication data (received data) received from the mobile body 22.

The process of generating data of retransmission information in step S6 shall be described below with reference to the flowchart shown in FIG. 5. The program of this process is executed primarily by the processing means 85.

When the processing means 85 receives the communication data in step S61, in step S62, the processing means 85 classifies the received data according to the mounted-device IDs. In step S63, the processing means 85 downloads updating information (updating data) of the respective mounted-device IDs by referring to the program information database 86, the download information database 90, and the manufacturer-dedicated information database 94.

In step S64, the processing means 85 determines whether there is updating data, which actually needs to perform updating.

For example, if updating data with respect to download information in an engineering service for device correcting software included in digital broadcasts is referred to, then the processing means 85 determines the tuner 34 of the broadcast receiving device 26 for digital broadcasts, which is mounted on the mobile body 22, from the mounted-device IDs within the received data, and judges that an update for information with respect to the digital broadcasts should be referred to.

In this case, the ES information determining means 88 searches the download information database 90 for engineering service data (hereinafter referred to as ES data) that was broadcast during the time period in which the tuner 34 of the broadcast receiving device 26 for digital broadcasts that is mounted on the mobile body 22 has been physically unable to receive digital broadcasts, from the "engine shutoff period" in the received data. The ES information determining means 88 extracts the engineering service data, and transfers the extracted data and its digest information to the transmission/retransmission information generating means 84 of the processing means 85. Other mounted-device IDs are similarly processed, wherein ES data therefor are transferred to the transmission/retransmission information generating means 84.

If it is judged that there is no updating data for the corresponding device ID in step S64, then the processing means 85 generates a packet indicating that there is not updating data as digest information corresponding to an indication of no updating data, and in step S65 transfers the generated packet to the transmission/retransmission information generating means 84.

If it is judged that there is updating data in step S64, then in step S66 the processing means 85 compares for magnitude the data size of the updating data with a threshold value in order to determine whether the data size is capable of being transmitted and received by the communication device 30 from the mounted-device ID of the communication device 30.

If it is judged in step S66 that the data size is of a size that is downloadable by the communication device 30, then in step S67 the processing means 85 adds a downloadable flag or the like to the updating data so as to generate a packet for downloading the updating data.

If it is judged in step S66 that the data size is an undownloadable size, then the processing means 85 generates a packet indicative of digest information representing the data size and updating contents, and in step S68, transfers the packet to the transmission/retransmission information generating means 84.

The updating data is thus determined for the mounted-devices IDs from all of the mobile bodies 22. In step S69, the transmission/retransmission information generating means 84 generates transmission data as compressed data representing updating information and its digest information.

In step S70, the generated transmission data is transmitted from the information center communication means 82, through the circuit network 12 and the base station 18, to the mobile body 22.

Figure 4:
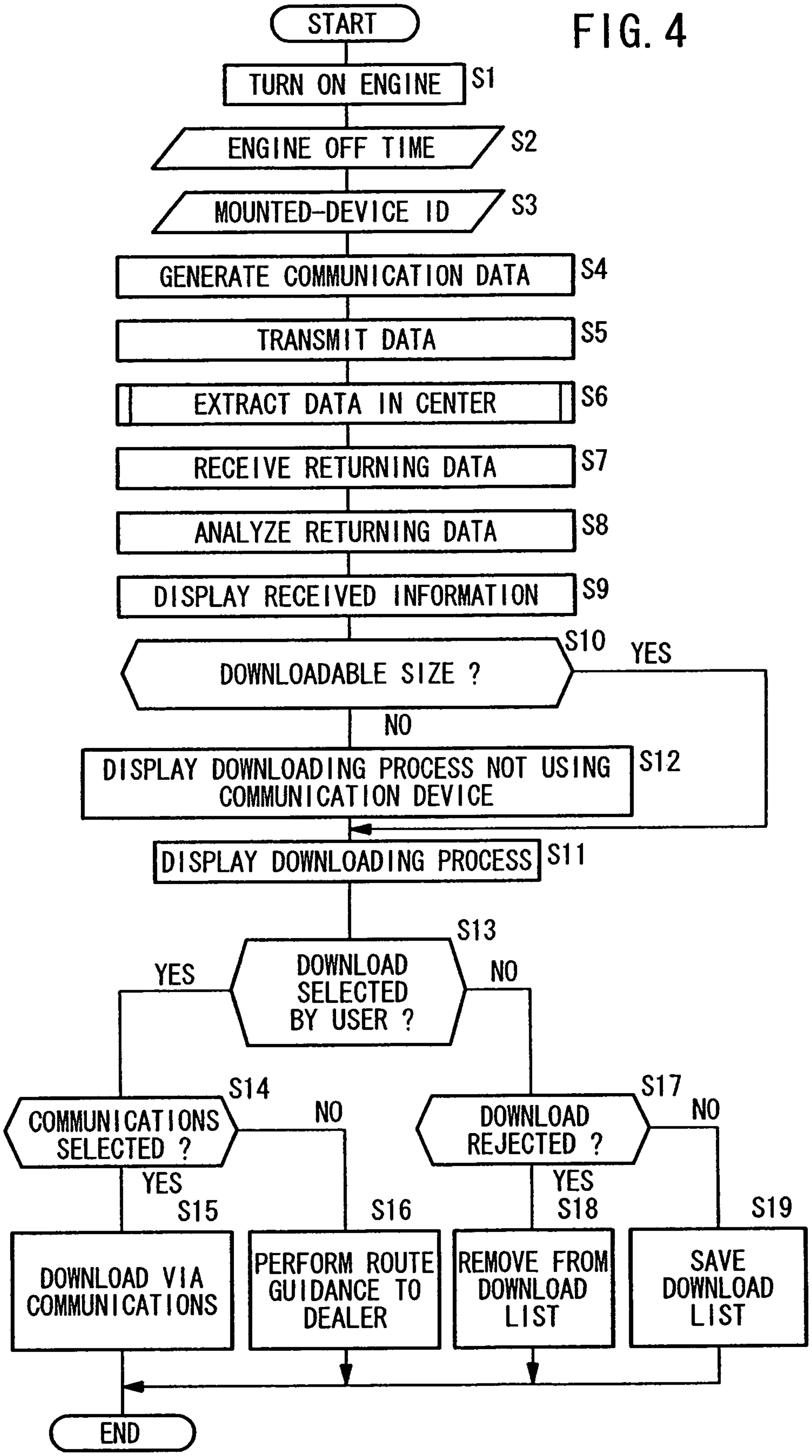
FIG. 4 is a flowchart of an operation sequence of the mobile body, for updating specifications of a device mounted on the mobile body via data communication.

In step S7, as shown in FIG. 4, the transmission data is received as returning data by the transceiver 38 of the communication device 30.

In step S8, the returning data is decompressed by the communication data decompressing unit 40, and analyzed by the communication data classifying unit 42 for each mounted-device ID. In step S9, the display unit 62 of the information providing device 60 displays updating information itself, which corresponds to the returning data or digest information of the updating information.

When the digest information or the updating information is displayed, if the user operates the input device 64 to select an item to be updated, then in step S10 it is determined whether or not the updating information is of a size that is downloadable by the communication device 30.

If it is judged that the updating information is of a downloadable size, then in step S11 a downloading process using the communication device 30 is displayed on the display unit 62.

If it is judged that the updating information is not of an downloadable size, then in step S12 a downloading process, which does not use the communication device 30, is displayed.

If the user selects a download by referring to the reception information and the digest information that have been displayed in step S13, and then the user selects a downloading process using the communication device 30 in step S14, then the updating information is downloaded via communications in step S15.

Specifically, data communications are carried out between the communication device 30 of the mobile body 22 and the information center communication means 82 of the information center 14, whereby the updating information (updating data) is downloaded through the transceiver 38, the communication data decompressing unit 40, and the communication data classifying unit 42, into the data storage unit 32. The downloaded data is then installed in mounted devices which need to be updated, such as the broadcast receiving device 26, the communication device 30, and the information providing device 60, etc., thereby updating the specifications and versions of these mounted devices on the mobile body 22. In this manner, the mounted devices are updated by using the latest available updating information at all times.

If the user refers to the digest information and wishes to download the updating information through the information providing device 60 by using a recording medium such as a DVD or the like in step S14, then a route to the dealer 20 near the location where the mobile body 22 is positioned is displayed on the display unit 62 of the information providing device 60. The user then goes to the dealer 20 in order to acquire, from the dealer 20, a recording medium that stores the program data to be downloaded. Alternatively, at the dealer 20, a recording medium owned by the dealer 20 is read by the information providing device 60 in order to download the updating information.

If the user who refers to the digest information does not select a download in step S13, then in step S17 a message is displayed to ask the user whether a download is to be rejected or not. If the user enters an answer to reject the download, then in step S18 the updating information is removed from the downloadable list.

If the user does not select to reject the download in step S17, then in step S19 the updating information is saved in the downloadable list within the data storage unit 32 for a predetermined period of time. After elapse of the predetermined period of time, the updating information is automatically removed.

According to the above embodiment, as described above, if the broadcast receiving device 26 could not receive information broadcast by the information center 14 through the transmitting station 16 during a period in which the engine of the mobile body 22 is shut off, or when the engine is subsequently started, if the communication device 30 could not receive updating information transmitted by the information center 14 through the circuit network 12 and the base station 18, an unreceivable period along with a mounted-device ID and time information (continuous unreceivable state period), which is generated by the communication data generator 46 of the mobile body 22, is indicated to the information center 14.

Based on the mounted-device ID and the unreceivable period, the server 24 of the information center 14 searches for information to be updated, whereby the retrieved updating information (updating data) can be downloaded through broadcasts or communications, or can be downloaded at the dealer 20.

According to the above embodiment, data updated by a broadcast or the like during a period in which the engine is shut off can be downloaded from the information center 14. According to another embodiment, the information center 14 may be arranged such that the download information database 90 updates information with respect to the mounted-device IDs on the mobile body 22 (e.g., installed software and data) at all times, based on an inherent ID of the mobile body 22, e.g., the chassis number of the mobile body 22, so that the latest information is automatically stored.

In this case, when the engine is in operation, the communication data generator 46 simultaneously transmits the inherent ID of the mobile body 22 (e.g., the chassis number of the mobile body 22) and the mounted-device IDs from the transceiver 38 through the circuit network 12 to the server 24 of the information center 14. Having received the inherent ID and the mounted-device IDs, the processing means 85 of the server 24 searches the download information database 90 through the ES information determining means 88, in order to provide reliably to the mobile body 22, which serves as the user, the latest information for individual mobile bodies 22 through the circuit network 12.

Situations in which the tuner 34 of the broadcast receiving device 26 as the broadcast receiving means is judged as being in an unreceivable state by the reception state determining unit 36 because the electric field intensity is too weak, regardless of whether the engine is in operation or is shut off, or in which an unreceivable state is judged because the error rate of the data received by the transceiver 38 as a mobile body communicating means is judged as being greater than a threshold value by the communication state determining unit 44, shall be considered below.

Figure 5:
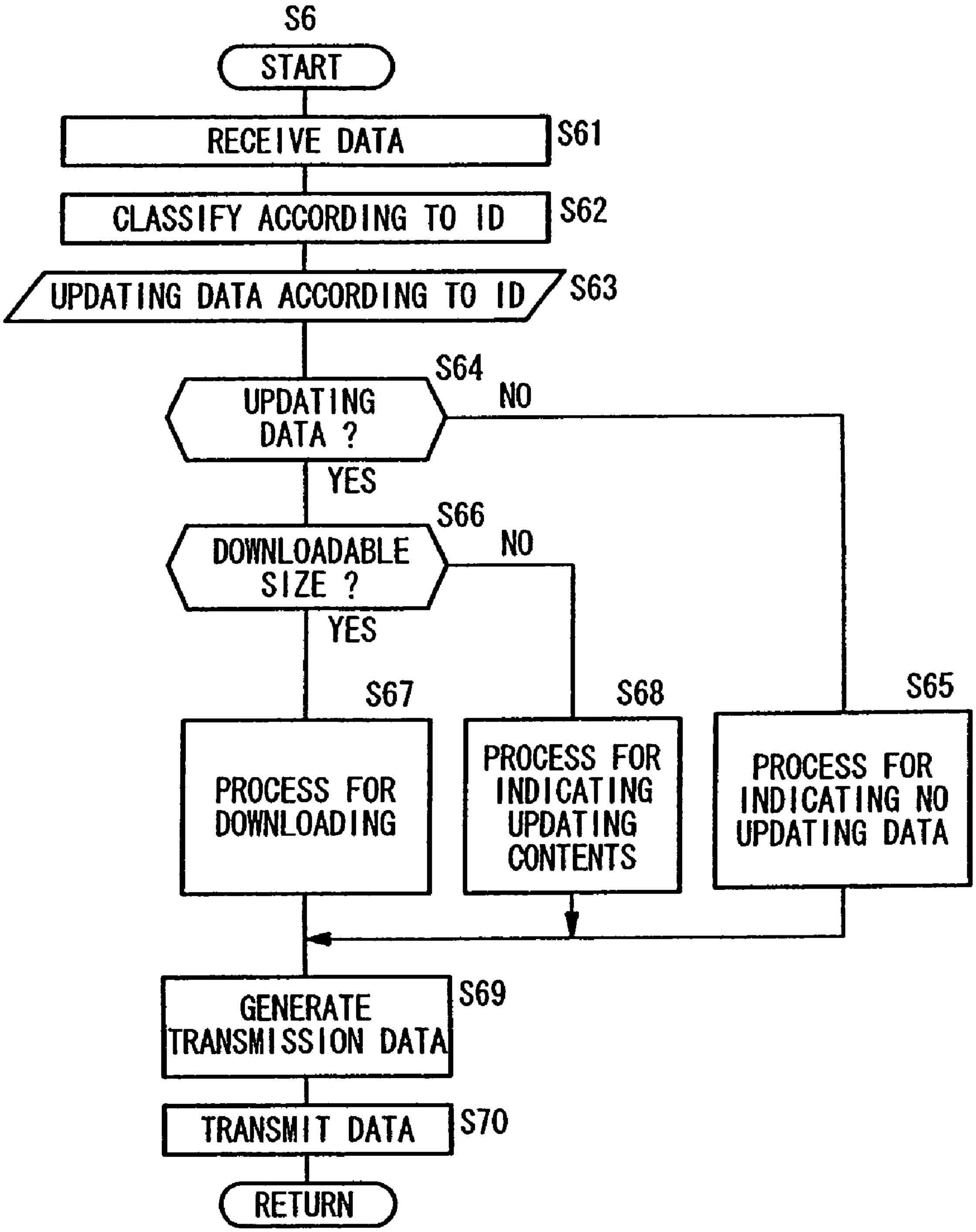
FIG. 5 is a flowchart of an operation sequence of the information center, for updating specifications of the device mounted on the mobile body via data communication.

If a period during which the mobile body 22 is positioned outside of the broadcasting area is judged as an unreceivable state (period), or a period in which the mobile body 22 is positioned outside of the communication area is judged as an uncommunicatable state (period), then, when the mobile body 22 returns from outside of the broadcasting area or the communication area into the broadcasting area or the communication area, information of a determined result of the unreceivable state together with time information and a mounted-device ID assigned thereto is processed in the same manner as when the engine is started, as shown in FIGS. 4 and 5. Consequently, even if communications are disabled for a long period of time, updating information, which has been updated during the disabled period, can be automatically downloaded and stored in the data storage unit 32 of the mobile body 22. In this case, functions of the mounted devices on the mobile body 22 can be updated into a latest state at all times.

In the above embodiment, it has been described that time information and information of mounted-device IDs are simultaneously transmitted from the mobile body 22 to the information center 14 in order to update the specifications of the mounted devices on the mobile body 22 at a suitable time. However, this arrangement may be modified in the following manner.

Mounted-device IDs are registered in the download information database 90 when the mobile body 22 initially communicates with the information center 14, thereby generating a registration list by relating the mobile body 22 and the mounted-device IDs to each other. Upon subsequent communications, updating information is extracted relating to devices that correspond to the mounted-device IDs that have already been registered in the registration list in the download information database 90. Upon further subsequent communications, if there is a mounted-device ID that needs to be newly added, then the mounted-device ID may be newly registered in the registration list when the mobile body 22 initially communicates with the information center 14 after a corresponding device has been mounted on the mobile body 22. If there is a mounted device that has been removed from the mobile body 22, for example, by replacement etc., then the mounted device ID may be removed from the registration list when the mobile body 22 initially communicates with the information center 14 after the device has been removed from the mobile body 22. Specifically, a mounted-device ID may be removed from the registration list by dismounting the mounted device from the mobile body 22, thereafter confirming the mounted device together with information as to whether or not there is a communication link through the network in the mobile body 22, and transmitting the information as to whether or not there is a communication link to the information center 14. Alternatively, when updating information is received from the information center 14, a judgement may be made that there is no corresponding mounted-device ID within the received data, in the mobile body 22, and the judgement may be indicated again to the information center 14 so as to remove the mounted-device ID from the registration list in the information center 14.

With the above modification, mounted-device IDs are not required to be transmitted at all times during communications, but only time information may be transmitted to download the updating information. In this manner, specifications of the mounted devices on the mobile body 22 can be updated into the latest specifications, i.e., can be updated into the latest information.

A process of downloading data updated through a broadcast from the information center 14 during an engine shutoff period after the engine has started has been described above. According to another downloading process, a broadcasting area map, and a communication area map of the broadcast receiving device 26 and the communication device 30, are stored in the database of the information providing device 60, which functions as a navigation system mounted on the mobile body 22.

In this case, the time when the mobile body 22 moves out of the area and the time when the mobile body 22 returns into the area are acquired from GPS data received by a GPS receiver that is mounted on the mobile body 22, and determined result information (outside-of-broadcasting-area determined result information, outside-of-communication-area determined result information) is transmitted to the information center 14. Based on the time information, the information center 14 searches for updating information as described above, and necessary updating information is downloaded to the mobile body 22, for thereby updating specifications of the mounted devices on the mobile body 22 to the latest specifications. In this example, the information providing device 60 functions as an outside-of-broadcasting-area determined result information generating means, and as an outside-of-communication-area determined result information generating means.

In the above embodiment, basically, the device updating information is automatically downloaded between the broadcasting/communication system 23 of the mobile body 22 and the server 24 of the information center 14. However, if a downloading command is given at a time selected by the user, then a data unreceivable time may possibly occur between a download starting time and a download ending time, in which case, if the data can be recovered, then only the interrupted data may automatically be downloaded. If the data cannot be recovered, then all of the information to be downloaded may automatically be downloaded. In this manner, the updating information can be stored in the data storage unit 32, while the user is not made aware of the interruption of the communications.

According to the above embodiment, as described above, the reception state determining unit 36, which serves as the determined result information generating means for determining an unreceivable state of the broadcast receiving device 26 or an uncommunicatable state of the communication device 30 and generating a determined result as information, the communication state determining unit 44, and the ignition switch 54 as an engine operating state determining unit are provided, and a determined result is generated and transmitted from the communication data generator 46 to the information center 14. Therefore, even if the latest information updated through broadcasts or communications (latest updating information) is not available due to an engine shutoff or a communication failure, a communication disabled period is transmitted together with mounted-device IDs from the mobile body 22 to the information center 14, after the engine has started or the mobile body 22 has recovered from the unreceivable state.

The information center 14 extracts updating information that was broadcast during the unreceivable time period from the download information database 90 of the information center 14, and transmits the extracted updating information as download information to the communication device 30 of the mobile body 22. Therefore, the latest updating information can be downloaded into the mounted devices on the mobile body 22 (the broadcast receiving device 26, the communication device 30, and the information providing device 60), in the same manner as with devices that are supplied with electric power at all times.

The download information, which serves as retransmission information transmitted to the communication device 30, may be information identical to unreceived information that cannot be received by the mobile body 22 or information that is a summary of the unreceived information, e.g., so-called digest information. Specifically, the user can select either retransmission of the unreceived information regardless of the intention of the user or transmission of digest information, which gives an opportunity for the user to determine whether information identical to the unreceived information is to be received or not, based on the digest information, in the manner described above with reference to step S13.

If the digest information is received as retransmission information, the user selects, with the input device 64 that serves as the selective information input means, guidance information for a broadcasting/communication area where information identical to the unreceived information can be received, or for a dealer 20 which is an area where an information recording medium such as a recording medium with the unreceived information recorded therein can be acquired (step S14 to step S16).

The present invention is not limited to the above embodiment, but may include other various arrangements based on the description of the present specification.

The invention claimed is:

1. A mobile communication system having an information center and a mobile body for acquiring information via at least one of broadcasting and communication services from said information center, wherein said mobile body comprises:

a broadcast receiving unit for receiving information broadcast by said information center;

an information storing unit for storing received information;

a communication state determining unit for determining an unreceivable state of said broadcast receiving unit, generating a determined result including an unreceivable period having an initial time and an ending time; and a mobile communication unit configured to communicatively connect with said information center for transmitting information, including said determined result, to and receiving information from said information center;

and wherein said information center comprises:

a broadcast transmitting unit for broadcasting information to said mobile body;

an information center communication unit configured to communicatively connect with said mobile body, for transmitting information to and receiving information, including said determined result, from said mobile body; and a retransmission information generating unit for determining a set of updating information that were broadcast when said mobile body was in said unreceivable state during said unreceivable period, based on a broadcast timestamp of a particular updating information falling within said initial time and ending time of said unreceivable period, and generating retransmission information to be retransmitted to said mobile body.

2. A mobile body comprising:

a broadcast receiving unit for receiving information broadcast by an information center;

a mobile communication unit configured to communicatively connect with said information center, for transmitting information to and receiving information from said information center;

an information storing unit for storing received information; and a communication state determining unit for determining an unreceivable state of said broadcast receiving unit, and generating a determined result including an unreceivable period having an initial time and an ending time, wherein, when said mobile communication unit transmits said determined result to said information center, said information center determines a set of updating information that were broadcast when said mobile body was in the unreceivable state during the unreceivable period, based on a broadcast timestamp of a particular updating information falling within the initial time and ending time of the unreceivable period, so as to generate and transmit retransmission information, and wherein said mobile communication means receives said retransmission information.

3. An information center comprising:

a broadcast transmitting unit for broadcasting information to a mobile body;

an information center communication unit configured to communicatively connect with said mobile body, for transmitting information to and receiving information, including a determined result providing an unreceivable period having an initial time and an ending time, from said mobile body; and a retransmission information generating unit for determining a set of updating information that were broadcast when said mobile body was in an unreceivable state during said unreceivable period, based on a broadcast timestamp of a particular updating information falling within said initial time and said ending time of said unreceivable period, and generating retransmission information to be retransmitted to said mobile body.

4. A mobile communication system having an information center and a mobile body for acquiring information via communication services from said information center, wherein said mobile body comprises:

an information storing unit for storing received information;

a communication state determining unit for determining an uncommunicatable state of said mobile communication unit, and generating a determined result including an unreceivable period having an initial time and an ending time; and a mobile communication unit configured to communicatively connect with said information center for transmitting information, including said determined result, to and receiving information from said information center;

and wherein said information center comprises:

an information center communication unit configured to communicatively connect with said mobile body, for transmitting information to and receiving information from said mobile body; and a retransmission information generating unit for determining a set of updating information that were transmitted when said mobile body was in said uncommunicatable state during said unreceivable period, based on a broadcast timestamp of a particular updating information falling within said initial time and ending time of said unreceivable period, and generating retransmission information to be retransmitted to said mobile body.

5. A mobile body comprising:

a mobile communication unit configured to communicatively connect with an information center, for transmitting information to and receiving information from said information center;

an information storing unit for storing received information; and a communication state determining unit for determining an uncommunicatable state of said mobile communication unit, and generating a determined result including an unreceivable period having an initial time and an ending time, wherein, when said mobile communication unit transmits said determined result to said information center, said information center determines a set of updating information that were broadcast when said mobile body was in said uncommunicatable state during said unreceivable period, based on a broadcast timestamp of a particular updating information falling within said initial time and ending time of said unreceivable period, so as to generate and transmit retransmission information, and wherein said mobile communication unit receives said retransmission information.

6. An information center comprising:

an information center communication unit configured to communicatively connect with said mobile body, for transmitting information to and receiving information, including a determined result providing an unreceivable period having an initial time and an ending time, from said mobile body; and a retransmission information generating unit for determining a set of updating information that were transmitted when said mobile body was in an uncommunicatable state during said unreceivable period, based on a broadcast timestamp of a particular updating information falling within said initial time and said ending time of said unreceivable period, and generating retransmission information to be retransmitted to said mobile body.

7. A mobile body according to claim 2, wherein an engine shutoff period of an engine of the mobile body is determined as the unreceivable state.

8. A mobile body according to claim 5, wherein an engine shutoff period of an engine of the mobile body is determined as the uncommunicatable state.

9. A mobile body according to claim 2, wherein a period in which said mobile body is positioned outside of a broadcasting area is determined as the unreceivable state.

10. A mobile body according to claim 5, wherein a period in which said mobile body is positioned outside of a communication area is determined as the uncommunicatable state.

* * * * *